(12) United States Patent
Engel et al.

(10) Patent No.: US 6,715,287 B1
(45) Date of Patent: Apr. 6, 2004

(54) METHOD AND DEVICE FOR CONTROLLING AN INTERNAL COMBUSTION ENGINE THAT IS PROVIDED WITH AN AIR SYSTEM

(75) Inventors: Gerhard Engel, Stuttgart (DE);
Manfred Birk, Oberriexingen (DE);
Frank Meier, Kornwestheim (DE);
Thomas Bleile, Stuttgart (DE);
Benedikt Kraus, Kornwestheim (DE);
Peter Rupp, Remseck (DE); Wolfgang Kraemer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,293

(22) PCT Filed: Sep. 13, 2000

(86) PCT No.: PCT/DE00/03181
§ 371 (c)(1),
(2), (4) Date: Oct. 8, 2002

(87) PCT Pub. No.: WO01/48363
PCT Pub. Date: Jul. 5, 2001

(30) Foreign Application Priority Data

Dec. 28, 1999 (DE) ........................................ 199 63 358

(51) Int. Cl.$^7$ .................. F02D 23/00; F02D 41/18; F02D 41/24; F02D 41/30; G01M 15/00
(52) U.S. Cl. ........................... 60/601; 60/603; 60/602
(58) Field of Search ................ 60/601, 602, 603

(56) References Cited

U.S. PATENT DOCUMENTS

| | | | | |
|---|---|---|---|---|
| 5,205,260 A | | 4/1993 | Takahashi et al. | 73/118.2 |
| 5,753,805 A | * | 5/1998 | Maloney | 73/118.2 |
| 6,192,867 B1 | * | 2/2001 | Fenchel et al. | 60/603 |
| 6,295,816 B1 | * | 10/2001 | Gallagher et al. | 60/601 |
| 6,327,856 B1 | * | 12/2001 | Iwabuchi et al. | 60/603 |
| 6,408,624 B1 | * | 6/2002 | Books et al. | 60/603 |

FOREIGN PATENT DOCUMENTS

| | | | |
|---|---|---|---|
| DE | 42 14 648 | 11/1993 | |
| DE | 197 56 619 | 10/1998 | |
| EP | 0 845 586 | 6/1998 | 73/118.2 |

* cited by examiner

Primary Examiner—Sheldon J. Richter
(74) Attorney, Agent, or Firm—Kenyon & Kenyon

(57) ABSTRACT

A device and a method for controlling an internal combustion engine with an air system are described. At least one variable characterizing the air system is determined on the basis of at least one correcting variable and/or at least one measured variable characterizing the state of the ambient air, using at least one model. The model includes at least one first and one second submodel. Using a submodel, the output variables are determined on the basis of input variables. As input variables of the first submodel, besides at least one output variable of a second submodel, the correcting variable and/or the measured variable are additionally taken into account.

30 Claims, 7 Drawing Sheets

METHOD AND DEVICE FOR CONTROLLING AN INTERNAL COMBUSTION ENGINE THAT IS PROVIDED WITH AN AIR SYSTEM

FIELD OF THE INVENTION

The present invention relates to a method and a device for controlling an internal combustion engine with an air system.

BACKGROUND INFORMATION

A method and a device for controlling an internal combustion engine are discussed in German Patent No. 197 56 619. A system is described for operating an internal combustion engine, particularly in a motor vehicle, in which the air is supplied to a combustion chamber via a throttle valve arranged in an intake manifold, the quantity flow via the throttle valve being determined. At the same time, a valve is disposed in an exhaust-gas recirculation line, the quantity flow via the valve in the exhaust-gas recirculation line likewise being determined. The air-quantity flow into the combustion chamber is determined on the basis of the two air-quantity flows. Problematical in this device is that different variables needed for the calculation can only be acquired with difficulty using sensors. Therefore, it is disadvantageous that a large number of sensors are necessary for detecting the different variables.

SUMMARY OF THE INVENTION

The procedure of the present invention makes it possible to determine at least one variable which characterizes the air system. In so doing, only a few measured variables are necessary which are easily detectable using simple, inexpensive sensors. Furthermore, variables are used which are present internally in the control unit for controlling the internal combustion engine.

It is of particular advantage that the model includes at least one first and one second submodel, which determine output variables on the basis of input variables, besides at least one output variable of a second partial model, the manipulated variable and/or measured values being additionally considered as input variables of the first submodel.

The model building becomes particularly simple when, as the manipulated variable, the following are used: a fuel quantity ME which characterizes the fuel quantity to be injected, an exhaust-gas recirculation on/off ratio ATV which characterizes the control signal for an actuator influencing exhaust gas recirculation, and/or a supercharger on/off ratio LTV which characterizes the control signal for an actuator influencing the characteristics of a turbine. Preferably, besides the fuel quantity ME, the exhaust gas recirculation on/off ratio ATV and/or the supercharger on/off ratio are additionally used. This is done independently of whether the internal combustion engine is equipped with an exhaust gas recirculation system and/or a supercharger.

At least one speed variable (N) which characterizes the speed of the internal combustion engine, an ambient air temperature (T1) which characterizes the temperature of the ambient air, and/or an ambient air pressure (P1) characterizing the pressure of the ambient air are used as measured variables. The speed, the ambient temperature and the ambient pressure may be used.

DETAILED DESCRIPTION

Figure 1:
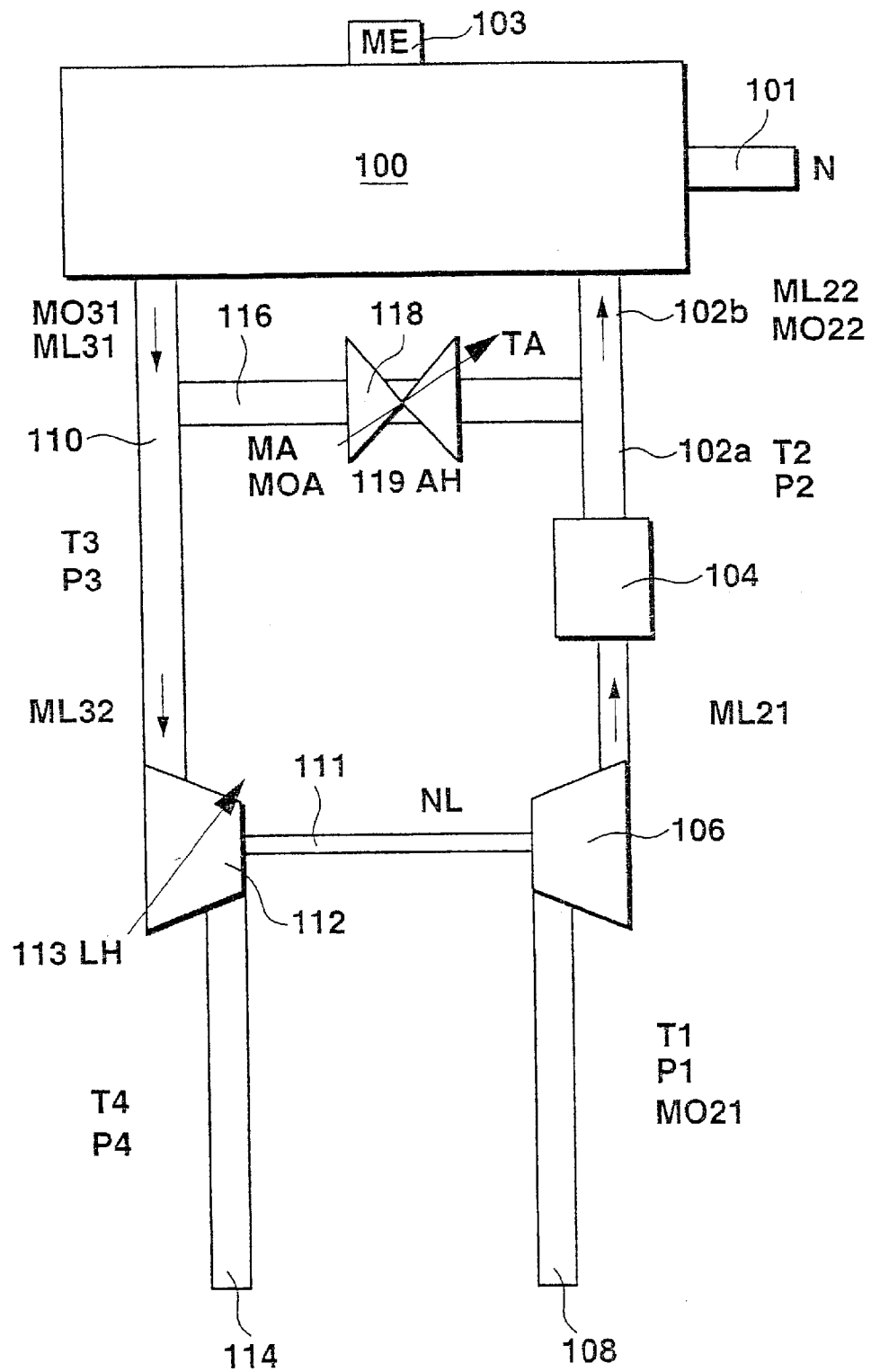
FIG. 1 shows a schematic representation of the internal combustion engine including an exemplary air system.

In the following, the procedure of the present invention is described using a diesel internal combustion engine as an example. However, the invention is not restricted to use in diesel internal combustion engines; it can also be used for other internal combustion engines, particularly for direct-injection gasoline internal combustion engines.

A certain air quantity ML22 containing a specific oxygen proportion MO22 is supplied to an internal combustion engine 100 via a high-pressure fresh-air line 102. The variable MO22 is also designated as oxygen proportion prior to combustion. High-pressure fresh-air line 102 includes two parts. The first part is denoted by 102a, and a second with 102b. The first part corresponds to the line up to exhaust gas admixture. The second part 102b corresponds to the line after exhaust gas admixture. The first part 102a may include a charge-air cooler 104. The air in the first part of high-pressure fresh-air line 102a has a temperature T2 and a pressure P2.

Ambient air reaches a compressor 106 via low-pressure fresh-air line 108, and then flows via charge-air cooler 104 into high-pressure fresh-air line 102. Air quantity ML21 having an oxygen proportion MO21 flows via the compressor into high-pressure fresh-air line 102. The air quantity ML21 having oxygen proportion MO21, which flows through low-pressure fresh-air line 108, corresponds to the air quantity having the corresponding oxygen proportion which flows through compressor 106 and charge-air cooler 104. Temperature T1 and pressure P1, which prevail in low-pressure fresh-air line 108, correspond to the ambient conditions, i.e. to the ambient pressure and the ambient temperature.

From internal combustion engine 100, air quantity ML31 having an oxygen proportion MO31 flows into a high-pressure exhaust gas line 110. The variable MO31 is also designated as the oxygen proportion after combustion. Temperature T3 and pressure P3 prevail in high-pressure exhaust gas line 110. These values are also denoted as exhaust gas pressure P3 and exhaust gas temperature T3.

An air quantity ML32 reaches a turbine 112 from high-pressure exhaust gas line 110, and this is also designated as the air quantity via the turbine. From turbine 112, the exhaust gas reaches a low-pressure exhaust gas line 114, which is also denoted as exhaust pipe 114. Temperature T4 and pressure P4 prevail in the low-pressure exhaust gas line.

Turbine 112 drives air compressor 106 via a shaft 111. Rotational speed NL of the shaft is denoted as the compressor rotational speed. The characteristic curve of the turbine, and thus of the entire supercharger, can be influenced by a supercharger controller 113. A control signal LTV is applied to supercharger controller 113 for actuation, which results in an adjustment of the supercharger by a lift LH. The quantity LH is also denoted as supercharger lift, and the quantity LTV as compressor on/off ratio.

A connection, designated as exhaust gas recirculation line 116, exists between high-pressure exhaust line 110 and high-pressure fresh-air line 102. Air quantity MA containing oxygen proportion MOA flows through this exhaust gas recirculation line 116. The cross section of exhaust gas recirculation line 116 is preferably controllable by an exhaust gas recirculation valve 118. A control signal ATV is applied to exhaust gas recirculation actuator 119 for actuation, which results in an adjustment of exhaust gas recirculation valve 118 by a lift AH. The quantity AH is also denoted as exhaust gas recirculation lift, and the quantity LTV as exhaust gas recirculation on/off ratio.

Speed N at the crankshaft and/or the camshaft of the internal combustion engine may be preferably detected by a speed sensor 101. In addition, fuel-quantity control elements 103 are provided which determine fuel quantity ME to be injected that is supplied to the internal combustion engine. To that end, control elements 103 receive a quantity signal ME.

For precise control of the internal combustion engine or rather of control elements 118 and 113, various of the quantities shown may be known. In particular, the oxygen quantity, that is to say, oxygen portion MO22 supplied to the internal combustion engine may be known. The oxygen quantity, together with injected fuel quantity ME, determines the exhaust gas emissions, particularly the soot emissions in the case of diesel internal combustion engines. Furthermore, it may be an advantage if the various pressure and temperature values are known. It may also be advantageous if the compressor rotational speed NL is known. These magnitudes may be used for monitoring the overall system and/or for controlling/regulating it.

It may be particularly advantageous if these magnitudes are not directly measured, but are determined using a model and/or one or more submodels. In that case, no corresponding sensors are needed.

Now, according to an exemplary embodiment of the present invention, it is provided that, by using at least one model, one of the variables or several of the variables which characterize the air system on the basis of one or more manipulated variables, particularly for the injected fuel quantity ME, the manipulated variable for exhaust gas recirculation valve ATV and manipulated variable LTV for turbine 112, and at least one measured variable with respect to ambient temperature T1 and/or ambient pressure P1 are determined. It may be of particular advantage if the one or more variables which characterize the air system are determined on the basis of fuel quantity ME to be injected, rotational speed N, and a variable characterizing the ambient temperature T1 and the ambient pressure P1, the manipulated variable of exhaust gas recirculation valve 118 and the manipulated variable of supercharger 112 also being used. This may be of particular advantage since the fuel quantity to be injected does not have to be detected, since this quantity is already known, and is used for controlling the internal combustion engine. In particular, an internal variable present in the control unit is used for this. The rotational speed N of the internal combustion engine is likewise known, since it is also indispensable for controlling the internal combustion engine. The corresponding consideration applies to the temperature and the pressure, T1 and P1. The corresponding also applies in the case of control signals for control elements 118 and 113.

It may be especially advantageous that various submodels are constructed for subsystems, each submodel calculating various input variables and, based on these, various output variables. In this context, it is provided that various input variables of various models are formed by output variables of other models. As input variables of the overall model in summation of the various submodels, only easily measurable measured quantities or known manipulated variables may be necessary.

Figure 2:
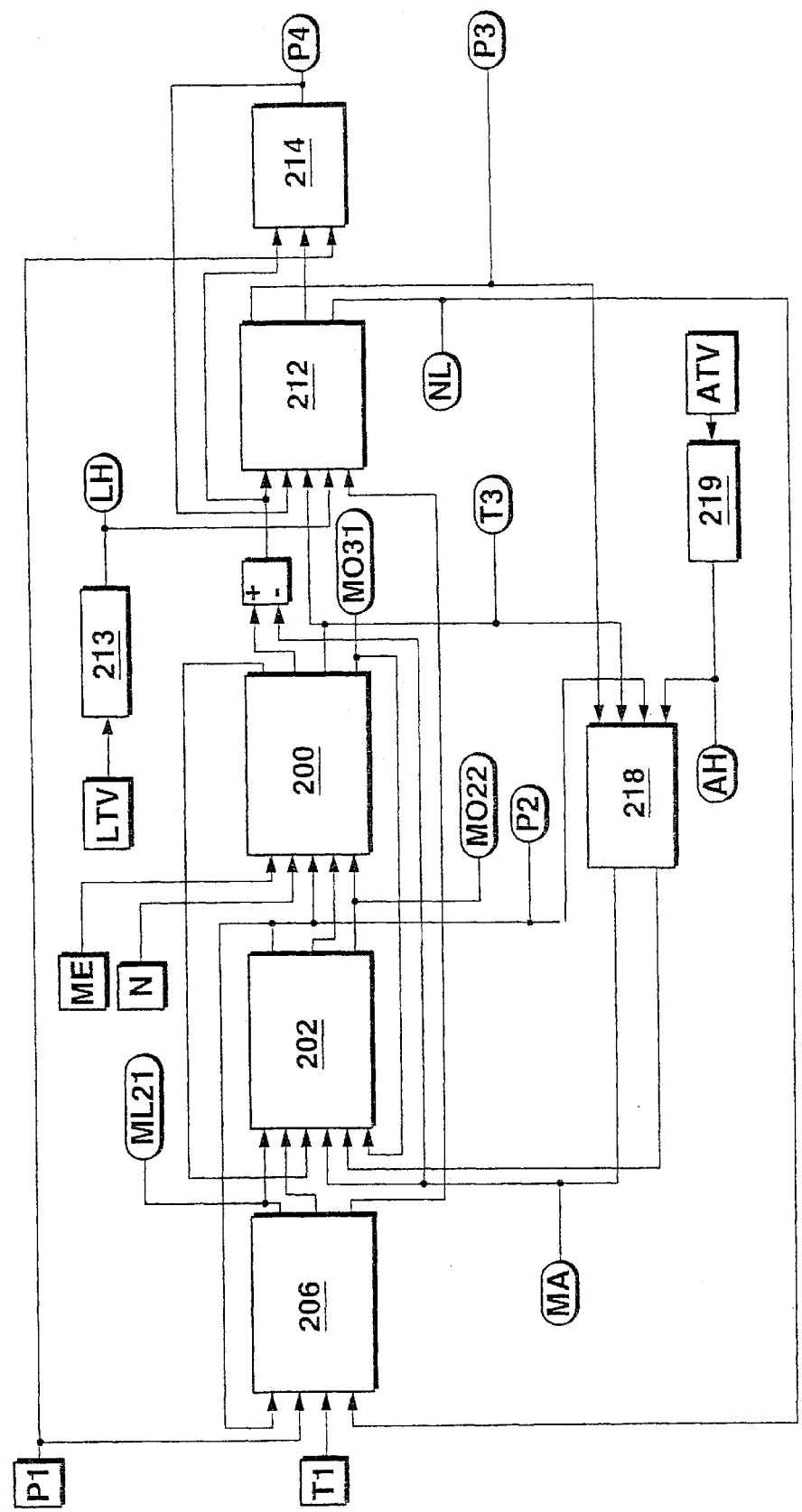
FIG. 2 shows the overall model of an exemplary air system as a block diagram.

The overall model of the air system and the subdivision into submodels of the air system are shown in FIG. 2.

In the case of modern internal combustion engines, increasingly greater requirements are placed on exhaust gas values and (fuel) consumption values. The turbosupercharger having variable turbine geometry permits adjustment to the current operating point of the engine by resetting the turbine's guide vanes. In this manner, a delayed response of the turbosupercharger may be avoided, and at the same time the degree of effectiveness of the internal combustion engine may be improved. Simultaneously, an exactly regulated quantity of exhaust gas is recirculated into the high-pressure fresh-air line via exhaust gas recirculation, whereby nitrogen oxide emissions are lowered considerably.

This brings about an air system for modern internal combustion engines which is distinguished by a high degree of internal coupling and great nonlinearities. Essential variables of the air system, such as the pressure in the high-pressure exhaust gas line, which will also be denoted as exhaust-gas counterpressure P3, or the instantaneously recirculated exhaust gas quantity MA, may be determined only with great effort, or not at all, using measuring technology. Sensors appropriate for this are not available, or are only available at very high cost.

In current systems, sensor signals are exclusively used for regulating air systems. That means that the air quantity signal with respect to air quantity ML21, which flows through low-pressure fresh-air line 108, is used only for controlling or regulating the position of exhaust gas recirculation valve 118. The measured charging-air pressure P2 is used only for influencing the actuator of turbine 112.

System-controlled cross-couplings are not given consideration in current systems, and therefore a disturbance variable in the individual control systems may result.

The system dynamics are approximately described by models, in the case of the method according to an exemplary embodiment of the present invention and the device according to an exemplary embodiment of the present invention. In this context, the real behavior is so abstracted that the remaining models may be calculated in real time in the engine control device. In spite of the simplification of the models, this may guarantee that the physical effects and the couplings between the individual systems, essential for regulation, are correctly reproduced.

According to an exemplary embodiment of the present invention, the physical interrelationships are greatly simplified. The model of the overall air system according to an exemplary embodiment of the present invention, which includes several submodels, may be used for solving various problems. For example, non-measurable signals of the air system, or signals of the air system only measurable with difficulty, may be computed approximately from available sensor data or manipulated variables. Available sensor data may be optimally linked, thus measuring uncertainty may be diminished. The measured variables and the detected variables may be filtered without phase shift, i.e. without loss of dynamics. When a sensor fails, a physically meaningful substitute value is available. Furthermore, functional structures may be greatly simplified by processing modeled, not measurable variables. For instance, monitoring of the supercharger can be carried out by evaluating the estimated supercharger rotational speed.

In FIG. 2 the overall model is represented in the light of a block diagram. In essence, the overall model contains various submodels for the individual components of the air system. A submodel for compressor 106 is denoted by 206. A submodel 202, which models high-pressure fresh-air line 102, is designated as model high-pressure fresh-air line. The intercooler is considered along with the model compressor 206. A further submodel 200 models the internal combustion engine 100, and is also designated as cylinder model. A further submodel 212 is designated as turbine model and models the behavior of turbine 112. A still further submodel 218 models the exhaust gas recirculation and is indeed designated as exhaust gas recirculation model 218. Another submodel 214 models exhaust pipe 114 and is designated as low-pressure exhaust gas line model.

The input variables of the overall model are preferably the on/off ratio LTV which is applied to compressor actuator 113, the injected fuel quantity ME, the current engine rotational speed N, the on/off ratio ATV which is applied to exhaust gas recirculation actuator 118, atmospheric pressure P1 and ambient air temperature T1. These input variables are denoted in FIG. 2 by small squares.

Instead of these variables, signals characterizing these variables may also be used. Thus, for example, instead of the injected fuel quantity, the fuel quantity to be injected or a signal specifying the duration of the injection may also be used. For example, instead of the on/off ratios, the lift of the actuators may be used directly.

Each variable computed in the model may be used as an output variable if it is needed for the control of the internal combustion engine. The use of the following output variables is particularly advantageous. They are: charge-air pressure P2, which corresponds to the pressure in high-pressure fresh-air line 102, exhaust gas counterpressure P3, which corresponds to the pressure in high-pressure exhaust gas line 110 between turbine 112 and internal combustion engine 100, the lift LH of supercharger actuator 113 of turbine 112, rotational speed NL of the supercharger, air quantity flow ML21 through compressor 106, exhaust gas temperature T3 before the turbine, exhaust gas counterpressure P4 which corresponds to pressure P4 in the exhaust pipe after the turbine, lift AH of the exhaust gas recirculation actuator 118, air quantity flow MA via exhaust gas recirculation line 116, oxygen proportion MO31 after combustion and oxygen proportion M022 before combustion.

By simple conversion, preferably using normalization constants, still further signals characterizing the corresponding variables may be determined.

Some of these variables determined by using the model may not be measured at the internal combustion engine, or only with great effort. For other variables, such as charge-air pressure P2, sensor signals are available. By making the comparison of the measured variables and those computed with the aid of the model, the model may be calibrated to the current situation.

The output variables of the model or the submodels are marked with circles or ellipses.

Figure 3:
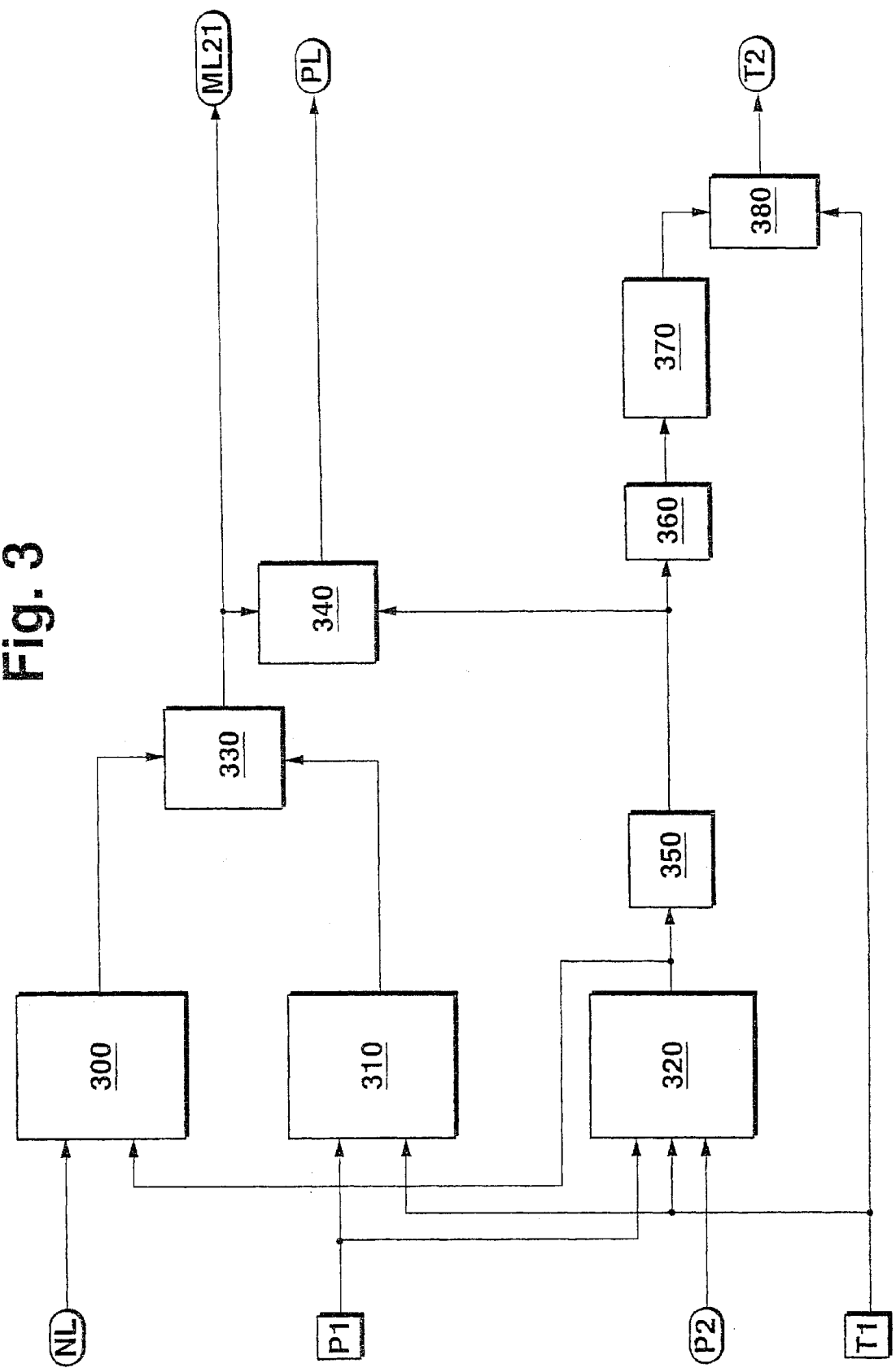
FIG. 3 shows an exemplary submodel as a block diagram.

In FIG. 3 the model of the compressor, which also takes into consideration the properties of the charge-air cooler, is shown in greater detail. The compressor processes, as input variables, signals which characterize the various variables. These are the supercharger rotational speed NL, ambient temperature T1 which corresponds to the temperature before the compressor, ambient pressure P1 which corresponds to the pressure before the compressor, and charge-air pressure P2 which corresponds to the pressure after the compressor.

Various output variables are determined on the basis of these signals. Essentially, these are: the mechanical power output PL picked up at shaft 111, charge-air temperature T2 which corresponds to the temperature of the compressed gas after the charge-air cooler, and the air quantity ML21 flowing through the compressor and through intake line 108.

Supercharger rotational speed NL is conveyed to a volume flow evaluation 300. Ambient pressure P1 is conveyed to density evaluation 310 and to an enthalpy evaluation 320. Charge-air pressure P2 likewise is sent to enthalpy evaluation 320. Ambient temperature T1 before the compressor is conveyed to a temperature evaluation 380, to enthalpy evaluation 320 and to density evaluation 310. The output signal of volume flow evaluation 300 and the output signal of density evaluation 310 are sent to a mass flow evaluation 330, which air mass flow ML21 determines as the output signal. The output signal of enthalpy evaluation 320 reaches volume evaluation 300, on the one hand, and energy evaluation 350. The output signal of energy evaluation 350 is applied to power output evaluation 340 and to a temperature evaluation 360. Power output evaluation 340 additionally has air mass flow ML21 conveyed to it. Power output evaluation 340 delivers signal PL with respect to the mechanical power output picked up at the shaft. Temperature evaluation 360 applies a signal to charge-air cooler model 370, which in turn applies a signal to temperature ascertainment 380. Temperature ascertainment 380 determines temperature signal T2.

The volume flow which flows through the compressor is computed as a function of the supercharger rotational speed and the enthalpy difference between the low-pressure side and the high-pressure side, i.e. between high-pressure fresh-air line 102 and low-pressure fresh-air line 108. The enthalpy difference is supplied by enthalpy evaluation 320. In this situation, the volume flow increases with supercharger rotational speed and decreases with increasing enthalpy difference. This interrelationship is emulated in volume evaluation 300, by the use of a characteristics map or a computation. The adjustment to specific properties of the compressor is made by using various constants.

Density evaluation 310 determines the density of the gas before the compressor in low-pressure fresh-air line 108, based on pressure P1 and temperature T1. Quantity evaluation 330 performs a determination by multiplying volume flow by the density of air mass flow ML21 through the compressor.

Enthalpy evaluation 320 determines the enthalpy difference of the gas before and after the compressor, as a function of temperature T1 before the compressor and the ratio of pressure P1 before the compressor and pressure P2 after the compressor. In addition, various constants, such as the gas constants and the isotropic exponent, are considered.

Using division of the enthalpy difference by the compressor efficiency, energy evaluation 350 determines the energy which is imparted to a certain quantity of compressed gas. The compressor efficiency may preferably be stored in a memory. In power output evaluation 340, the energy is multiplied by air mass flow ML21, which flows through the compressor. This multiplication yields the mechanical power output currently picked up at the shaft.

Temperature evaluation 360 computes the energy imparted to the gas by compression, that is, the heating of the gas in the compressor. A portion of this heat is removed again from the gas by charge-air cooler 104. Charge-air cooler model 370 takes this into consideration. The proportion of the heat removed from the gas is greater the greater the effectiveness of the charge-air cooler. That means that, as a function of the effectiveness of the charge-air cooler, the temperature ascertained in temperature evaluation 360 is decreased. In temperature evaluation 380 this temperature, by which the air in the compressor is heated, is added to the temperature of the gas T1 before the compressor, which yields temperature T2 of the gas after the compressor, or rather, after the compressor and the charge-air cooler. If the model is to be adapted to an engine not having a charge-air cooler, the effectiveness of the cooler is set to zero, i.e. the value zero is subtracted in charge-air cooler model 370.

According to an exemplary embodiment of the present invention, air mass flow ML is given by the density and the volume flow of the air which flows through the compressor. The density is determined by temperature T1 and pressure P1 of the ambient air. The volume flow of the air is obtained from the supercharger rotational speed and the enthalpy difference at the inlet and the outlet of the compressor. In this context, the enthalpy difference is computed from the pressure difference and temperature T1 of the gas. This means that, based on the supercharger rotational speed NL, ambient pressure P1, charge-air pressure P2 and ambient temperature T1, the compressor model determines air mass flow ML21, which flows through the compressor, the supercharger power output PL and the charge-air temperature.

It may be of particular advantage that only temperature T1 and pressure P1 are measured using sensors, and the remaining variables are determined using other models.

Figure 4:
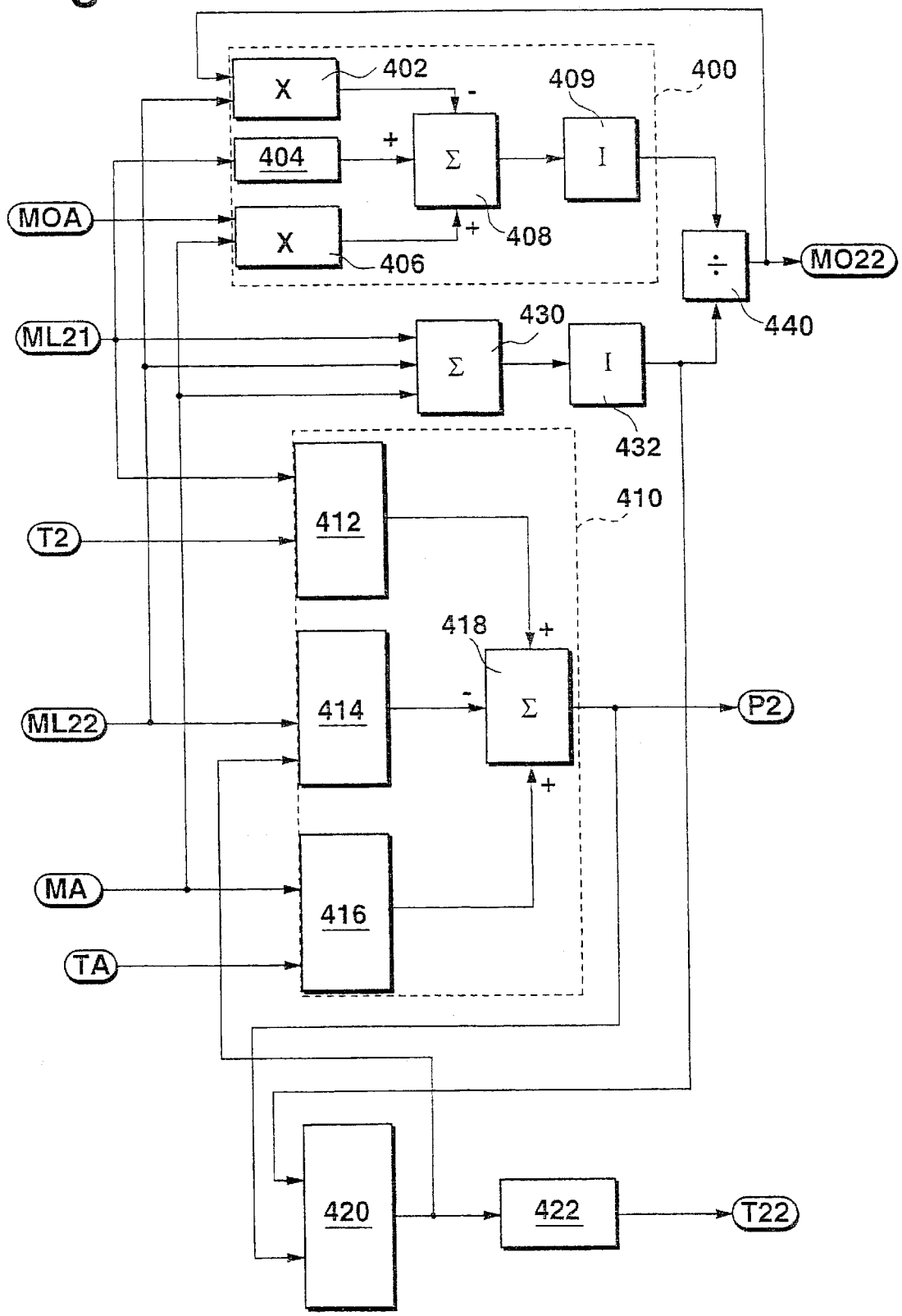
FIG. 4 shows an exemplary submodel as a block diagram.

FIG. 4 shows the submodel for the high-pressure fresh-air line, i.e. the model for intake line 102, as a block diagram. The supply line between compressor 106 and the intake valve into the cylinder is modeled as a container in which the state variables of the gas are linked by the ideal gas equation. The flow speed of the fresh air and all the effects resulting therefrom are ignored for the sake of simplicity of the model. As input variables for this model the following may preferably be used: Air quantity ML21 which flows from the compressor, charge-air temperature T2 of the gas after charge-air cooler 104, air quantity ML22 which flows into the internal combustion engine, air quantity MA which is recirculated as exhaust gas into high-pressure fresh-air line 102, temperature TA in the exhaust gas recirculation which corresponds to the temperature of the recirculated exhaust gas, and oxygen proportion MOA in the recirculated exhaust gas.

On the basis of these input variables, the output variables are computed by using physically motivated linkages. The following are determined as output variables: Charge-air pressure P2 in high-pressure fresh-air line 102, charge-air temperature T2 in the high-pressure fresh-air line and oxygen proportion MO2 in the air supplied to the internal combustion engine.

The submodel for high-pressure fresh-air line 102 includes essentially an oxygen quantity evaluation 400, a pressure evaluation 410, a temperature evaluation 420 as well as an integration 432 which determines the overall mass.

Oxygen quantity evaluation 400 includes essentially a first oxygen quantity evaluation 402, a second oxygen quantity evaluation 404 and a third oxygen quantity evaluation 406, whose output signals are summed up by a summation device 408 with appropriate signs, and are subsequently integrated by an integration device 409. Air quantity ML22, which corresponds to the air quantity reaching the internal combustion engine, and oxygen proportion MO22 of the air which reaches the internal combustion engine are conveyed to the first oxygen quantity evaluation. Signal ML 21 with respect to the air quantity delivered by the compressor is conveyed to second oxygen quantity evaluation 404. Signal MOA with respect to the air quantity flowing in the exhaust gas recirculation line is conveyed to the third oxygen quantity evaluation.

By multiplication of the respective air quantity by the oxygen proportions, the first, second and third oxygen quantity evaluations determine the oxygen quantities of the respective air quantities. In this connection, the oxygen quantity evaluation multiplies the air quantity ML21 by a fixed factor, which corresponds to the oxygen proportion in the normal ambient air. The various oxygen quantities are integrated with the correct sign, i.e. the inflowing with a plus and the outflowing with a minus.

The air quantities which flow in and out of high-pressure fresh-air line 102 are also integrated with the correct sign by addition device 430 and integrator 432. This yields the current overall air quantity in the container. On the basis of this overall air quantity in the container and the oxygen proportion in high-pressure fresh-air line 102, which is determined by oxygen quantity evaluation 400, one obtains oxygen proportion MO22 of the air quantity flowing into the internal combustion engine.

The change in the partial pressures in high-pressure fresh-air line 102 is calculated from the individual quantity flows, the respective temperature, the volume and gas constant R. First partial pressure evaluation 412 calculates the partial pressure based on air quantity ML21, which flows in through compressor 106, and temperature T2 after charge-air cooler 104. Second partial pressure evaluation 414 determines the partial pressure based on air quantity ML22 which flows into the internal combustion engine, and temperature T22 which corresponds to the temperature of the air quantity directly before the internal combustion engine. This temperature is also designated as mixture temperature T22. Third partial pressure evaluation 416 determines the partial pressure, based on air quantity MA which flows through exhaust gas recirculation line 116 and temperature TA in the exhaust gas recirculation line. The partial pressure calculations are preferably developed as calculations which compute the variables according to a formula on the basis of input variables.

The partial pressure increases in each case with increasing air quantity and/or increasing temperature. The changes in the partial pressures are added with correct sign by sunrmation 418. The inflowing portions are entered with a positive sign and the outflowing portions with a negative sign. Thus one obtains the change of pressure P2 in the high-pressure fresh-air line. By the integration of the pressure changes over time one obtains current charge-air pressure P2.

On the basis of pressure P2 thus determined for the high-pressure fresh-air line, which was computed as described above, and of the gas quantity computed by integrator 432, temperature evaluation 420 directly determines mixture temperature T22, with the aid of the ideal gas equation and using the gas constant R.

The model of the high-pressure fresh-air line determines charge-air pressure P2, oxygen proportion MO22 of the gas flowing into the internal combustion engine, and mixture temperature T22 on the basis of air quantities ML21, ML22 and MA and their oxygen proportions, which flow in or out of the high-pressure fresh-air line, of charge-air temperature T2 and of temperature TA in the exhaust gas recirculation line.

According to an exemplary embodiment of the present invention, oxygen proportion MO22 in air quantity ML22 which flows into the internal combustion engine is given by air quantity ML22, by air quantity ML21 which flows through the compressor, by air quantity MA which flows in the exhaust gas recirculation line, by the respective oxygen proportions and various constants. Charge-air pressure P2 is given preferably by integration of the contributions to pressure change made by inflowing or outflowing air quantities and their temperatures.

It is of particular advantage that only charge-air temperature T2 is measured using a sensor, and the remaining variables are determined using other models. In one particularly advantageous embodiment, the charge-air temperature is determined using the compressor model.

Figure 5:
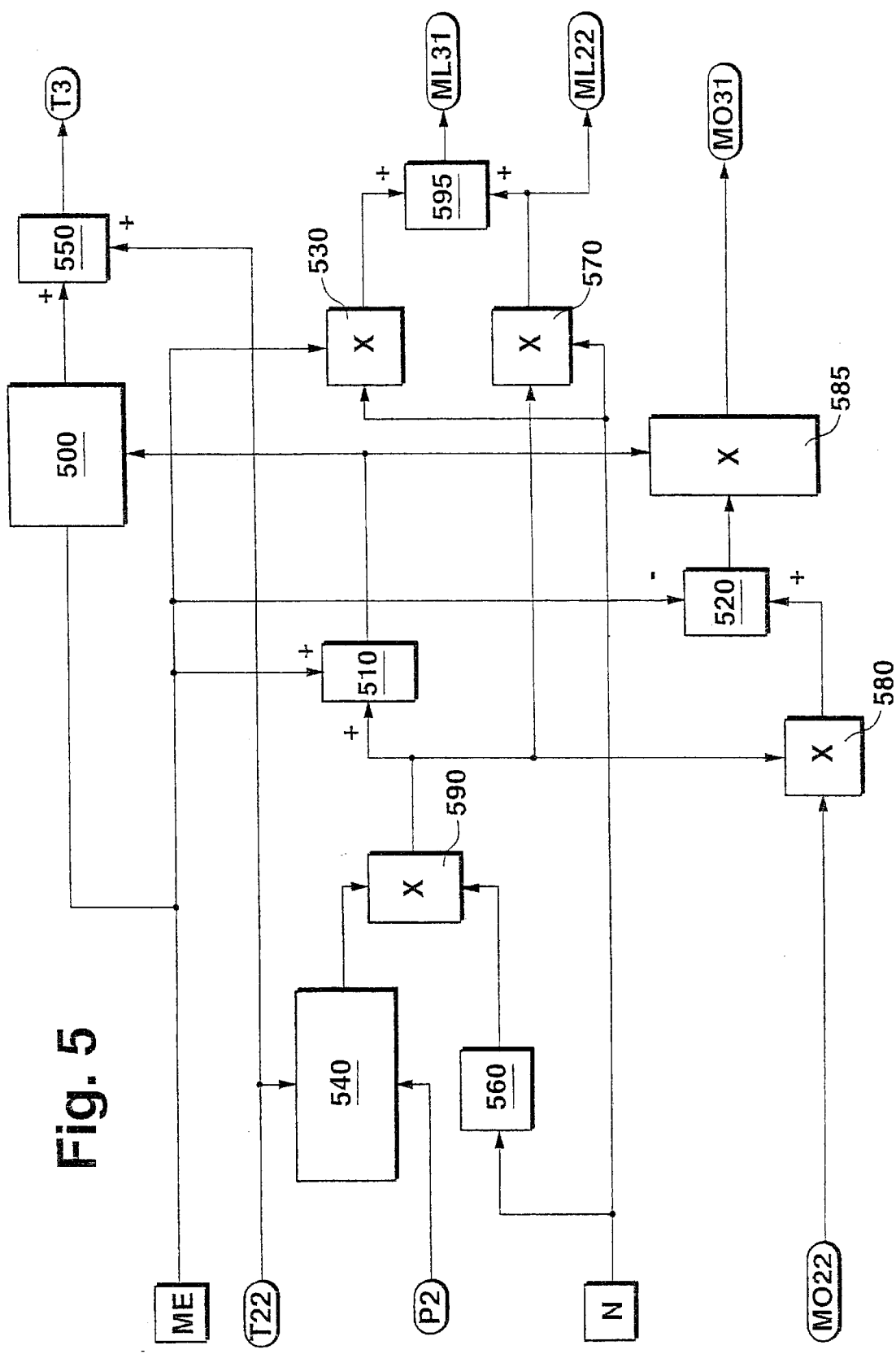
FIG. 5 shows an exemplary submodel as a block diagram.

FIG. 5 shows cylinder model 200 in greater detail. Signals are conducted to cylinder model as input variables. They are: a signal ME which characterizes the fuel quantity to be injected or already injected, mixture temperature T22, this being the temperature of the air fed to the cylinder, charge-air pressure P2 which corresponds to the pressure of the cylinder, rotational speed N of the internal combustion engine, and oxygen proportion MO22 of the air fed to the internal combustion machine.

The model delivers as output variables various signals which characterize the following variables. They are: Exhaust gas temperature T3 with this signal characterizing the temperature of the gas in high-pressure exhaust gas line 110, air quantity ML31 which flows from the internal combustion engine into high-pressure exhaust gas line 110, air quantity ML22 which flows into the internal combustion engine, and oxygen proportion MO31 of air quantity ML31 which flows from the internal combustion engine.

Fuel quantity ME which is to be injected reaches, on the one hand, a heating evaluation 500, an addition point 510, to an addition point 520 using a negative sign, and a multiplication point 530. Mixture temperature T22 reaches, on the one hand, an intake quantity computation 540, and, on the other hand, an addition point 550. Charge-air pressure P2 reaches intake quantity computation 540. Rotational speed signal N reaches, on the one hand, a filling ratio correction 560 and, on the other hand, a multiplication point 570. Oxygen proportion MO22 reaches a linkage point 580.

The output signals of filling ratio correction 560 and intake quantity computation 540 are conveyed to a multiplication point 590, which, in turn, applies signals to addition point 510, multiplication point 570 and multiplication point 580.

Addition point 550 makes exhaust gas temperature T3 available. The output signal of multiplication point 530 and the output signal of multiplication point 570 reach an addition point 595 which makes available air quantity ML31. Air quantity ML22 is present at the output of multiplication point 570. Oxygen proportion MO31 forms the output signal of a multiplication point 585, which divides the output signal of addition point 520 by the output signal of addition point 510.

At known displacement of the internal combustion engine, from charge-air pressure P2 and mixture temperature T2 of the fresh air flowing into the internal combustion engine, intake quantity computation 540 computes the theoretically possible gas quantity in the cylinder, using the ideal gas equation. This increases proportionally to charge-air pressure P2, and decreases when the air temperature increases. This theoretical cylinder charge is corrected at multiplication point 590 with the aid of current rotational speed N, based on the signal from charge correction 560, whereby the dynamic effects during the charging of the cylinder are considered. From the gas quantity per lift and rotational speed N thus obtained, linkage point 570 computes air quantity ML22 which flows into the internal combustion engine, preferably with the aid of multiplication of the two variables and/or multiplication by diverse constants.

Air quantity ML31, which corresponds to exhaust gas quantity flow, is given by addition of air quantity ML22 which flows into the internal combustion engine to the fuel quantity flow, in linkage point 595. The fuel quantity flow is determined by linkage of fuel quantity ME to be injected with rotational speed N, in linkage point 530. For this purpose, the two signals are multiplied by each other and by various constants.

Heating evaluation 500 calculates the heating of the cylinder charge as a function of injected fuel quantity ME and the gas quantity in the cylinder. The more fuel is injected and the less gas there is in the cylinder, the greater is the heating. The engine-specific relationship between injected fuel quantity ME and the heat conveyed to the gas is taken care of by a characteristics map. Exhaust gas temperature T3 is then given by addition in addition point 550 of the output signal of heating evaluation 500 and the temperature of charge-air temperature T2.

The overall gas quantity in the cylinder is yielded by addition of the fuel quantity to be injected to the gas quantity per lift, which is made available by linkage point 590 at addition point 510.

Linkage point 580 computes the oxygen quantity in the cylinder before combustion, from oxygen content MO22 of the air quantity fed to the cylinder and the overall gas quantity which corresponds to the output signal of linkage point 590. As a first approximation, the oxygen quantity withdrawn from the cylinder charge is proportional to injected fuel quantity ME. The oxygen quantity after combustion is given by subtraction of this oxygen quantity as a function of the fuel quantity in linkage point 520 from the oxygen quantity in the cylinder before combustion. Thus, the oxygen quantity after combustion is present at the output of linkage point 520. By forming a relationship in linkage point 585 of this oxygen quantity to the overall gas quantity which corresponds to the output signal of linkage point 510, one obtains oxygen proportion MO31 after combustion.

According to an exemplary embodiment of the present invention, exhaust gas temperature T3 is determined on the basis of fuel quantity ME to be injected and mixture temperature T22. The mixture temperature corresponds to the temperature of the gas which flows into the internal combustion engine. The exhaust gas temperature corresponds to the temperature of the gas which leaves the internal combustion engine. Furthermore, air quantities ML22 and ML31, which flow into and out of the internal combustion engine, are computed on the basis of mixture temperature T22 and charge-air pressure P2 of the gas flowing into the internal combustion engine, of rotational speed N of the internal combustion engine and of fuel quantity ME to be injected. This computation is carried out essentially by calculating, and subsequently linking with one another in a suitable manner, various quantity variables based on temperature, pressure, fuel quantity, rotational speed and known constants.

Figure 6:
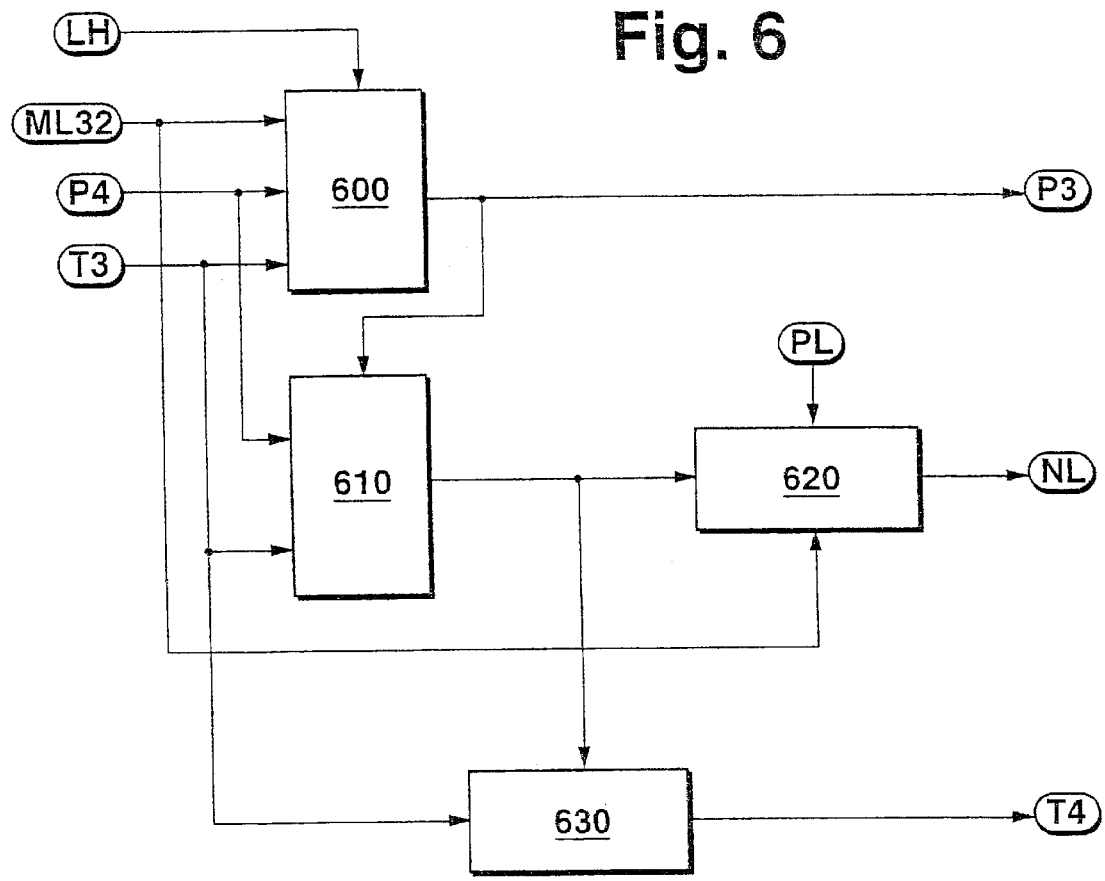
FIG. 6 shows an exemplary submodel as a block diagram.

FIG. 6 shows turbine model 212 in greater detail. In the model shown here, a turbine having variable geometry is simulated. As input variables, preferably various signals are used which characterize the following operating variables. They are: Air quantity ML32 which flows through the turbine, pressure P4 in exhaust pipe 114, a signal which characterizes the pressure after the turbine, exhaust gas temperature T3 which characterizes the gas temperature before the turbine, the supercharger lift which characterizes the position of the guide vanes, as well as a power output PL at shaft 111 which characterizes the mechanical power output picked up by the supercharger.

By suitable linkage of these variables, and by consideration of various physical as well as system-specific constants, various output variables are obtained. These are: Exhaust gas pressure P3 which characterizes the pressure before the turbine, temperature T4 in the exhaust pipe, i.e. after the turbine, and supercharger rotational speed NL.

Supercharger lift LH, air quantity ML32 through the turbine, pressure P4 in the exhaust pipe, and exhaust gas temperature T3 are conveyed to a pressure evaluation 600. Exhaust gas pressure P3 is present at the output of pressure evaluation 600. The pressure of the turbine which corresponds to exhaust gas pressure P3, and the pressure after the turbine which corresponds to pressure P4, as well as exhaust gas temperature T3 are conveyed to an. enthalpy difference evaluation 610. Its output signal reaches a supercharger rotational speed evaluation 620, which also processes air quantity ML32 through the turbine and supercharger power output PL. Supercharger rotational speed evaluation 620 delivers supercharger rotational speed NL as output variable. Air quantity ML32 which flows through the turbine, and the output signal of enthalpy difference evaluation 610 reach a temperature evaluation 630 which makes available temperature T4 in the exhaust pipe as an output signal.

On the basis of supercharger lift LH which characterizes the position of the guide vanes of the turbine, the position of the guide vanes is converted to an effective cross sectional plane, preferably using a characteristic curve. In this context, an open position of the guide vanes corresponds to a large surface. At known effective surface, turbine pressure P3 before the turbine is computed on the basis of air quantity ML32, pressure P4 after the turbine, temperature T3 before the turbine, as well as various physical constants, with the aid of pressure evaluation 600. These computations are made in pressure evaluation 600 with the use of a formula.

An increase in the quantity flow, temperature T3 of the turbine and pressure P4 after the turbine each leads to an increase in pressure P3 of the turbine. On the other hand, a larger effective cross section leads to a falloff in pressure P3 of the turbine.

Enthalpy difference evaluation 610 determines the enthalpy difference of the gas before and after the turbine, i.e. it determines the energy difference per gas quantity, on the basis of the pressure of the turbine P3, the pressure after the turbine P4, temperature T3 before the turbine, as well as various physical constants. The enthalpy difference grows with the pressure relationship between the pressure before and the pressure after the turbine and with the temperature before the turbine.

The power output obtained instantaneously in the turbine is given by the product of the enthalpy difference, the turbine efficiency and air quantity ML32 through the turbine. The difference between turbine power output and supercharger power output leads to a change in rotational energy of shaft 111, i.e. to an increase or decrease of the angular speed, and thus of the supercharger rotational speed. This is converted via a suitable factor into the rotation, or rather the rotational speed of the supercharger. Supercharger rotational speed evaluation 620 computes supercharger rotational speed NL on the basis of this variable. The turbine efficiency of the supercharger is in this case preferably assumed to be a constant, or it can be stored in a characteristics map.

The temperature evaluation determines the energy removed from the gas from the enthalpy difference and the turbine efficiency. The removed energy is linked directly to the temperature difference before and after the turbine by physical constants. Cooling-off evaluation 630 determines temperature T4 after the turbine, on the basis of temperature T3 before the turbine and this temperature difference.

According to an exemplary embodiment of the present invention, exhaust gas pressure P3 is determined on the basis of supercharger lift LH, air quantity ML32 which flows through the turbine, pressure P4 after the turbine and exhaust gas temperature T3. The enthalpy difference across the turbine is determined on the basis of the pressure difference across the turbine which is calculated from exhaust gas pressure P3 and pressure P4 after the turbine, and from the exhaust gas pressure. The calculation of temperature T4 in the exhaust pipe is made on the basis of the enthalpy difference and exhaust gas temperature T3. The supercharger rotational speed is determined on the basis of the enthalpy difference, supercharger power output PL and air quantity ML32 which flows through the turbine.

Figure 7:
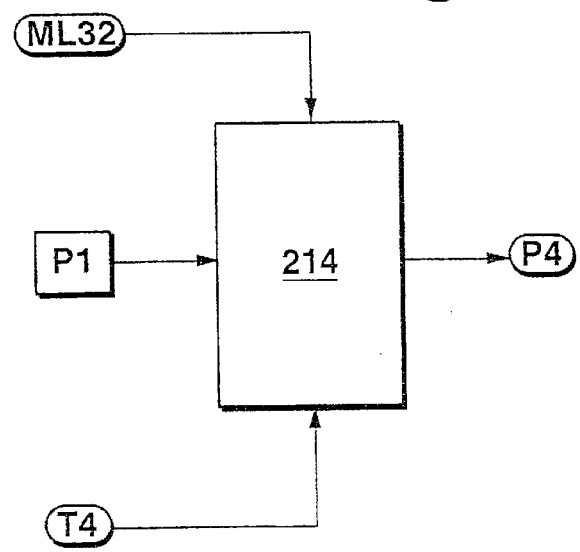
FIG. 7 shows an exemplary submodel as a block diagram.

FIG. 7 shows the model of the exhaust pipe, i.e. of low-pressure exhaust gas line 114. This model determines pressure P4 after the turbine, based on air quantity ML32 through the turbine, ambient pressure P1 and temperature T4 after the turbine in the exhaust pipe.

The model of exhaust tract 214 is used for modulating the effects of the exhaust tract on the pressure after the turbine. The overall exhaust tract is modeled as spatially concentrated baffle. Starting from the effective baffle area, model 214 determines pressure P4 after the turbine which corresponds to the pressure above the baffle, on the basis of air quantity ML32, ambient pressure P1 which corresponds to the pressure below the baffle, temperature T4 above the baffle as well as two material constants.

In this connection, pressure P4 after the turbine increases with increasing air quantity ML32, increasing atmospheric pressure P1 and increasing temperature T4 after the turbine. A greater effective area has the effect of a falloff of the pressure after the turbine. Preferably the effective baffle area is regarded as a constant.

Figure 8:
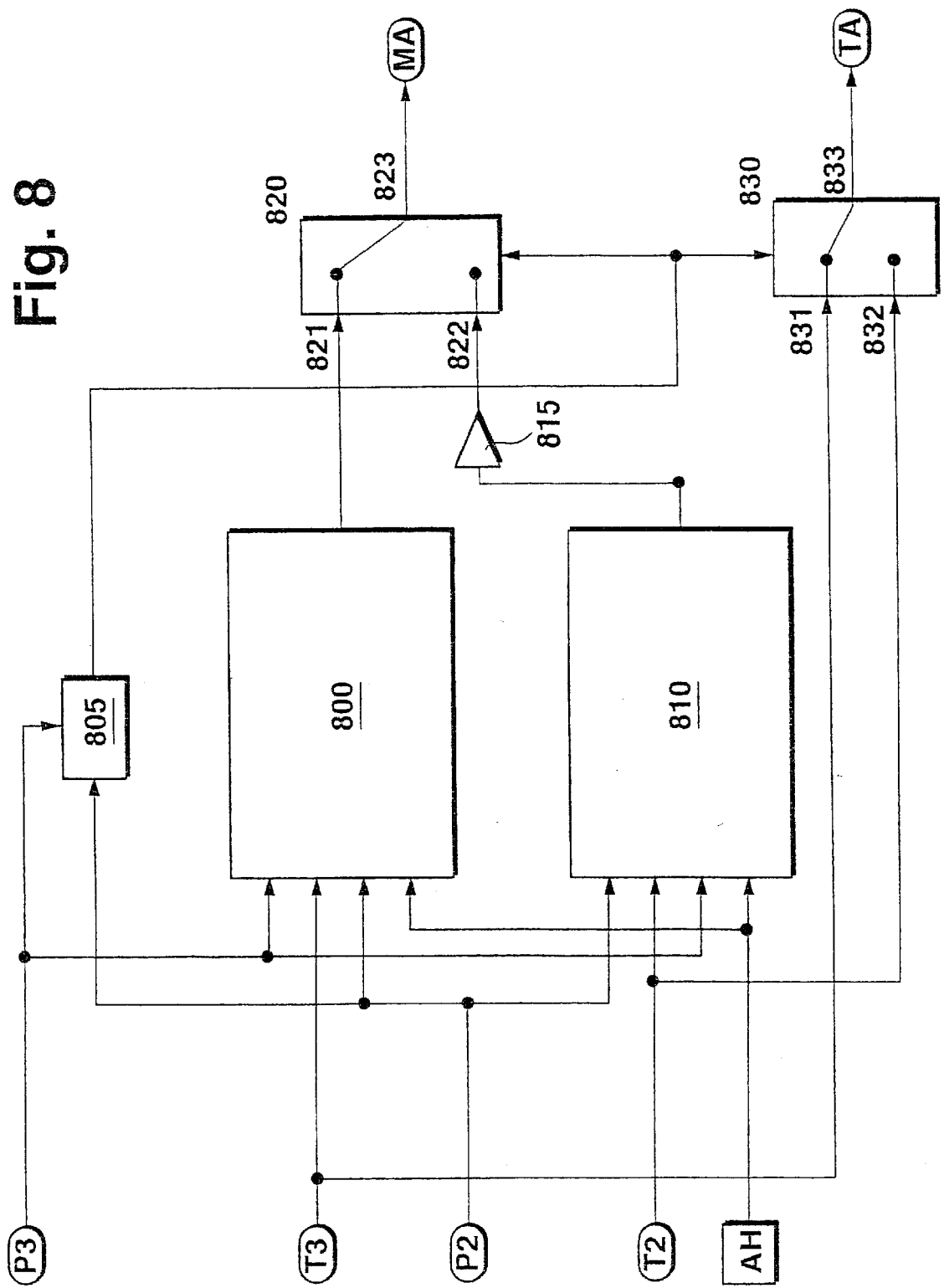
FIG. 8 shows an exemplary submodel as a block diagram.

FIG. 8 shows exhaust gas recirculation model 218 in more detail. The exhaust gas recirculation model takes into consideration the changes in the air system, when a part of the exhaust gas reaches the intake tract again. Exhaust gas recirculation model 218 takes into consideration (certain) signals as input signals. These are: Exhaust gas pressure P3 which characterizes the pressure in the high-pressure exhaust gas line, exhaust gas temperature T3, charge-air pressure P2, charge-air temperature T2, and exhaust gas recirculation lift AH which characterizes the lift of exhaust gas recirculation valve 118.

The output variables are determined based on these variables by appropriate linking. These are especially air quantity MA which flows through exhaust gas recirculation valve 118, and temperature TA which characterizes the temperature of the exhaust gas shortly before its mixing with the fresh mixture.

Charge-air pressure P2 and exhaust gas pressure P3, which characterize the pressure difference across the exhaust gas recirculation valve, are conveyed to a commutation 805.

All signals with the exception of charge-air temperature T2 are passed to a first quantity evaluation 800. All signals with the exception of exhaust gas temperature T3 are passed to a second quantity evaluation 810.

Exhaust gas temperature T3 and charge-air temperature T2 reach first input 831 and second input 832 respectively of a second commutation 830.

The output signal of first quantity evaluation 800 reaches first input 821, and output signal 810 reaches second input 822 of a first commutation 820 via a sign reversal 815.

Air quantity MA, which flows through the exhaust gas recirculation valve, is present at the output of the first commutation. At the output of second commutation 830 temperature TA is present in the exhaust gas recirculation line. The two switching elements 820 and 830 are activated as a function of the output signal of commutation 805.

Quantity evaluation 800 or 810 determine the air quantity MA which flows through the exhaust gas recirculation valve, preferably by the use of a throttle equation. Air quantity MA, which flows through the exhaust gas recirculation valve is essentially a function of the pressure and the temperature before the exhaust gas recirculation valve and the pressure after the exhaust gas recirculation valve, and of the effective area of the exhaust gas recirculation valve.

In this context, the air quantity increases with increasing pressure difference and with increasing effective area. It decreases with increasing temperature before the valve.

The direction of quantity flow through the exhaust gas recirculation valve depends on whether exhaust gas pressure P3 in the high-pressure exhaust gas line is greater or less than charge-air pressure P2 in the high-pressure fresh-air line. Because of this, two quantity evaluations are provided. Which of the two predefines the air quantity is determined by the setting of switching element 820. The setting of switching element 820 depends on the pressure difference across the exhaust gas recirculation valve. It is also a function of this pressure difference, and thus also of the flow direction, which temperature TA prevails in the exhaust gas recirculation line.

The effective area of the throttle is a function of the exhaust gas recirculation lift AH of the exhaust gas recirculation valve and is preferably taken account of in the form of an applicable characteristic curve. If exhaust gas pressure P3 is greater than charge-air pressure P2, the output signal of the first quantity evaluation is used as air quantity MA, and exhaust gas temperature T3 is used as temperature TA. This corresponds to the setting of the switching elements shown in FIG. 8.

If, on the other hand, charge-air pressure P2 is greater than exhaust gas pressure P3, the switching elements are put into the positions not shown in the drawing, and the output signal of second quantity evaluation 810 determines air quantity MA or the temperature TA corresponds to charge-air temperature T2.

According to an exemplary embodiment of the present invention, air quantity MA, which flows through the exhaust gas recirculation valve, is derived on the basis of the pressure difference across the exhaust gas recirculation valve, the temperature of the air which flows across the exhaust gas recirculation valve and the exhaust gas recirculation lift AH. The pressure differences may be computed on the basis of exhaust gas pressure P3 and charge-air pressure P2. Charge-air temperature T2 or exhaust gas temperature T3 are used optionally, as a function of the pressure difference, as the temperature of the air in the exhaust gas recirculation line.

Control of the exhaust gas recirculation may be improved considerably if a signal is present which characterizes the air quantity which flows through the exhaust gas recirculation valve.

It is difficult to implement a sensor that delivers such a signal because it is exposed to very high temperatures and great contamination because of its position in the exhaust gas quantity flow.

In today's usual systems an indirect procedure is selected. In that case, a pneumatically activated exhaust gas recirculation valve is opened or closed until an air quantity ML21, measured by a sensor, attains its setpoint value. The recirculated exhaust gas quantity is given by the difference between air quantity ML22 which flows into the internal combustion engine and air quantity ML21 which flows through the compressor.

This procedural method has two substantial disadvantages: In the case of small recirculated exhaust gas quantities, the tolerances of the sensor for detecting the air quantity lead to very large errors in the exhaust gas recirculation rate. The control circuit for the exhaust gas recirculation valve includes many partially idle components, so that the dynamics remain limited. Both effects, i.e. high tolerances and insufficient dynamics lead to deteriorated exhaust gas values.

In the case of exhaust gas recirculation actuators having an integrated displacement sensor, the position of the valve is very rapidly and exactly reset by using a subordinate control circuit.

In the electrical exhaust gas recirculation valve the required force is generated by an electromagnet. In the case of a subordinate position regulation, the current position of the valve is measured by a displacement sensor, and the current is varied until the valve has assumed the desired position. In this end position, the current is a measure of the required retention force. This depends essentially on the pressure difference before/after the valve. The current through the coil is a measuring signal of the pressure difference across the exhaust gas recirculation valve.

On the basis of the known valve geometry, the exhaust gas recirculation lift, and the pressure difference, the quantity flow through the valve, normalized with respect to temperature, is computed. The valve geometry is determined constructively. The lift is obtained from the integrated displacement sensor. The pressure difference is derived from the coil current.

The current signal present in a position-regulated electrical exhaust gas recirculation valve is used for determining the pressure difference across the exhaust gas recirculation valve.

The temperature-normalized air quantity MA, which flows through the exhaust gas recirculation valve, may be determined from charge-air pressure P2, the pressure difference, exhaust gas recirculation lift AH and the valve geometry.

According to an exemplary embodiment of the present invention, this value is used as the actual value in a subordinate control circuit for air quantity MA. Thereby, the temperature-normalized air quantity, which flows through the exhaust gas recirculation valve, may be set rapidly and precisely.

Smaller tolerances for the control of the exhaust gas recirculation rate can be realized by using direct measurement of air quantity MA. By using subordinate regulation of normalized air quantity MA, a substantial improvement of the dynamics is attainable.

A gas force FP acts upon the exhaust gas recirculation valve because of the pressure difference between the high-pressure exhaust gas line and the high-pressure fresh-air line. In order to hold the valve, this force must be compensated for by the force of electromagnet FM. This force is a direct function of the current through the magnet $I_m$.

This yields the measuring equation for pressure difference:

$$P3-P2=f_1(FM)=f_2(AH,I_m)$$

The nonlinear relationship $f_2$ is determined by measuring on a suitable test device. The current pressure difference is determined on the basis of the known relationship $f_2$, lift AH and current $I_m$ flowing through the electromagnet.

The temperature-normalized quantity flow through a valve is given by the flow equation as:

$$MA_{norm} = MA\sqrt{T3} = A(AH)P3\Psi\left(\frac{P3}{P2}\right)$$

where $MA_{norm}$ temperature-normalized mass flow
MA mass flow
P2 charge-air pressure
P3 exhaust gas pressure
T3 exhaust gas temperature
A(AH) throttle coefficient
$\Psi$ flow function The variation of the throttle coefficient as a function of the lift, as well as the exact pattern of the flow function have to be determined ahead of time by measuring on a suitable test device.

The temperature-normalized air quantity is calculated using the above equation. Air quantity MA, which flows through the exhaust gas recirculation valve, is determined from the temperature-normalized air quantity together with a measured or estimated value of exhaust gas temperature T3. This calculation takes place, for example, in quantity evaluations 800 and 810.

The other submodels are not absolutely necessary for this procedure. Thus the charge-air pressure can be measured directly and exhaust gas pressure P3 can be determined based on the pressure difference and charge-air pressure P2. In this connection, the pressure difference may preferably be determined from exhaust gas recirculation lift AH and the flow through the valve.

The determination of supercharger lift LH, based on on/off ratio LTV for the supercharger, takes place in block 213 The corresponding conversion of activating signal ATV for the exhaust gas recirculation valve to exhaust gas recirculation lift AH of the exhaust gas recirculation valve takes place in block 219 of FIG. 2.

Block 213 and block 219 are formed similarly as far as their construction is concerned. The two blocks differ only in the type of their conversion. Each includes a characteristics map or a conversion which convert the respective on/off ratio LTV or ATV to a lift. In a first step, the on/off ratio is limited to a physically meaningful value between 0% and 100%. The dynamics of the electropneumatic converter are asymmetrical, i.e. the lift of the actuator moves in one direction clearly more rapidly than in the other direction. This is modeled by an asymmetrical PT1 time-delay element. That means, for increasing and decreasing output variables AH or LH, different time constants are active. The output of the PT1 element is used as an input variable of a characteristic curve to be applied. Here, the delayed on/off ratio is converted into a relative lift between 0% and 100%. This lift LH or AH is then used as an input variable of the various models.

What is claimed is:

1. A method for controlling an internal combustion engine with an air system, comprising:

determining, using at least one model, at least one variable characterizing the air system on the basis of at least one of at least one correcting variable and at least one measured variable characterizing a state of an ambient air, the at least one model including at least one first submodel and at least one second submodel; and determining, using at least one of the at least one first submodel and the at least one second submodel, a plurality of output variables based on a plurality of input variables;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the at least one correcting variable includes at least one of:
the fuel quantity variable;
an exhaust-gas recirculation on/off ratio characterizing a first control signal for a first actuator influencing an exhaust-gas recirculation; and
a supercharger on/off ratio characterizing a second control signal for a second actuator influencing a plurality of characteristics of a supercharger.

2. A method for controlling an internal combustion engine with an air system, comprising:

determining, using at least one model, at least one variable characterizing the air system on the basis of at least one of at least one correcting variable and at least one measured variable characterizing a state of an ambient air, the at least one model including at least one first submodel and at least one second submodel; and determining, using at least one of the at least one first submodel and the at least one second submodel, a plurality of output variables based on a plurality of input variables;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the at least one measured variable includes at least one of:
at least one rotational speed variable characterizing a rotational speed of the internal combustion engine;
an ambient temperature characterizing a temperature of the ambient air; and
an ambient pressure characterizing a pressure of the ambient air.

3. The method as recited in claims 1 or 2, further comprising:

determining by a compressor model at least an air quantity flowing through a compressor, a supercharger power output, and a charge-air temperature;

wherein the determining operation by the compressor model is based on at least a supercharger rotational speed, an ambient pressure, a charge-air pressure, and an ambient temperature.

4. A method for controlling an internal combustion engine with an air system, comprising:

determining using at least one model, at least one variable characterizing the air system on the basis of at least one of at least one correcting variable and at least one measured variable characterizing a state of an ambient air, the at least one model including at least one first submodel and at least one second submodel;

determining, using at least one of the at least one first submodel and the at least one second submodel, a plurality of output variables based on a plurality of input variables;

determining by a compressor model at least an air quantity flowing through a compressor, a supercharger power output, and a charge-air temperature;

determining a density of air flowing through the compressor from the ambient temperature and the ambient pressure;

determining an enthalpy difference from the ambient pressure and a charge-air pressure; and determining a volume of air from the supercharger rotational speed and the enthalpy difference;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the determining operation by the compressor model is based on at least a supercharger rotational speed, an ambient pressure, a charge-air pressure, and an ambient temperature.

wherein the air quantity is determined based on the density and the volume.

5. The method as recited in claims 1, 2, or 4, further comprising:

determining using a high-pressure fresh-air line model at least a charge-air pressure, an oxygen proportion of an air quantity flowing into the internal combustion engine, and a mixture temperature;

wherein the determining operation using the high-pressure fresh-air line model is based on at least a plurality of air quantities flowing into a high-pressure fresh-air line, a plurality of oxygen proportions of the plurality of air quantities, a charge-air temperature, and a temperature in an exhaust gas recirculation line.

6. A method for controlling an internal combustion engine with an air system, comprising:

determining, using at least one model, at least one variable characterizing the air system on the basis of at least one of at least one correcting variable and at least one measured variable characterizing a state of an ambient air, the at least one model including at least one first submodel and at least one second submodel;

determining, using at least one of the at least one first submodel and the at least one second submodel, a plurality of output variables based on a plurality of input variables; and determining using a high-pressure fresh-air line model at least a charge-air pressure, an oxygen proportion of an air quantity flowing into the internal combustion engine, and a mixture temperature;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the determining operation using the high-pressure fresh-air line model is based on at least a plurality of air quantities flowing into a high-pressure fresh-air line, a plurality of oxygen proportions of the plurality of air quantities, a charge-air temperature, and a temperature in an exhaust gas recirculation line;

wherein at least one of the following is satisfied:

the oxygen proportion is determined based on the plurality of air quantities, the plurality of oxygen proportions of the plurality of air quantities, and at least one constant; and the charge-air pressure is determined by integrating contributions of a plurality of pressure changes, the plurality of pressure changes being predefined based on at least one of an inflowing air quantity, an outflowing air quantity, an inflowing air temperature, and an outflowing air temperature.

7. A method for controlling an internal combustion engine with an air system, comprising:

determining, using at least one model, at least one variable characterizing the air system on the basis of at least one of at least one correcting variable and at least one measured variable characterizing a state of an ambient air, the at least one model including at least one first submodel and at least one second submodel;

determining, using at least one of the at least one first submodel and the at least one second submodel, a plurality of output variables based on a plurality of input variables; and computing by a cylinder model at least an exhaust gas temperature, a first air quantity flowing into the internal combustion engine, a second air quantity flowing out of the internal combustion engine, and a second oxygen proportion of the second air quantity;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the computing operation is based on at least the fuel quantity, a rotational speed, a charge-air pressure, a mixture temperature, and a first oxygen proportion of the first air quantity.

8. The method as recited in claim 7, wherein at least one of:

the exhaust gas temperature is determined based on the fuel quantity and the mixture temperature; and the first air quantity and the second air quantity air are determined based on at least one of the mixture temperature, the charge-air pressure, the rotational speed, and the fuel quantity.

9. A method for controlling an internal combustion engine with an air system, comprising:

determining, using at least one model, at least one variable characterizing the air system on the basis of at least one of at least one correcting variable and at least one measured variable characterizing a state of an ambient air, the at least one model including at least one first submodel and at least one second submodel;

determining, using at least one of the at least one first submodel and the at least one second submodel, a plurality of output variables based on a plurality of input variables; and determining using a turbine model at least an exhaust gas pressure, a supercharger rotational speed, and a temperature after a turbine;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the determining operation using the turbine model is based on at least a supercharger lift, an exhaust gas temperature, a pressure after the turbine, and an air quantity flowing through the turbine.

10. The method as recited in claim 9, wherein at least one of:

the exhaust gas pressure is determined based on the supercharger lift, the air quantity flowing through the turbine, the pressure after the turbine, and the exhaust gas temperature;

an enthalpy difference across the turbine is determined based on a pressure difference across the turbine, the pressure difference across the turbine being calculated from the exhaust gas pressure, the pressure after the turbine, and the exhaust gas temperature;

a temperature in an exhaust pipe is determined based on the enthalpy difference and the exhaust gas temperature; and the supercharger rotational speed is determined based on the enthalpy difference, a supercharger power output, and the air quantity flowing through the turbine.

11. The method as recited in claim 9, further comprising at least one of:

determining the exhaust gas pressure based on the supercharger lift, the air quantity flowing through the turbine, the pressure after the turbine, and the exhaust gas temperature;

determining an enthalpy difference across the turbine based on a pressure difference across the turbine and the exhaust gas temperature;

determining the temperature after the turbine based on the enthalpy difference and the exhaust gas temperature; and determining the supercharger rotational speed based on the enthalpy difference, a supercharger power output, and the air quantity flowing through the turbine.

12. A method for controlling an internal combustion engine with an air system, comprising:

determining, using at least one model, at least one variable characterizing the air system on the basis of at least one of at least one correcting variable and at least one measured variable characterizing a state of an ambient air, the at least one model including at least one first submodel and at least one second submodel;

determining, using at least one of the at least one first submodel and the at least one second submodel, a plurality of output variables based on a plurality of input variables; and determining using an exhaust pipe model a pressure after a turbine based on at least an air quantity flowing through the turbine, an ambient pressure, and a temperature after the turbine;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected.

13. A method for controlling an internal combustion engine with an air system, comprising:

determining, using at least one model, at least one variable characterizing the air system on the basis of at least one of at least one correcting variable and at least one measured variable characterizing a state of an ambient air, the at least one model including at least one first submodel and at least one second submodel;

determining, using at least one of the at least one first submodel and the at least one second submodel, a plurality of output variables based on a plurality of input variables; and determining using an exhaust gas recirculation model a temperature in an exhaust gas recirculation line and an air quantity flowing through the exhaust gas recirculation line;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the determining operation using the exhaust gas recirculation model is based on an exhaust gas recirculation lift, a first temperature before an exhaust gas recirculation valve, a second temperature after the exhaust gas recirculation valve, a first pressure before the exhaust gas recirculation valve, and a second pressure after the exhaust gas recirculation valve.

14. The method as recited in claim 13, further comprising:

determining an air quantity flowing through the exhaust gas recirculation valve based on a pressure difference across the exhaust gas recirculation valve, a temperature of the air flowing through the exhaust gas recirculation valve, and the exhaust gas recirculation lift.

15. The method as recited in claim 14, wherein one of a charge-air temperature and an exhaust gas temperature is used, as a function of the pressure difference across the exhaust gas recirculation valve, as the temperature of the air in the exhaust gas recirculation line.

16. A system for controlling an internal combustion engine with an air system, comprising:

an arrangement for determining, using at least one model, at least one variable characterizing the air system on the basis of at least one of at least one correcting variable and at least one measured variable characterizing a state of an ambient air, the at least one model including at least one first submodel and at least one second submodel; and an arrangement for determining, using at least one of the at least one first submodel and the at least one second submodel, a plurality of output variables based on a plurality of input variables;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the at least one correcting variable includes at least one of:
the fuel quantity variable;
an exhaust-gas recirculation on/off ratio characterizing a first control signal for a first actuator influencing an exhaust-gas recirculation; and
a supercharger on/off ratio characterizing a second control signal for a second actuator influencing a plurality of characteristics of a supercharger.

17. A system for controlling an internal combustion engine with an air system, comprising:

an arrangement for determining, using at least one model, at least one variable characterizing the air system on the basis of at least one of at least one correcting variable and at least one measured variable characterizing a state of an ambient air, the at least one model including at least one first submodel and at least one second submodel; and an arrangement for determining, using at least one of the at least one first submodel and the at least one second submodel, a plurality of output variables based on a plurality of input variables;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the at least one measured variable includes at least one of:
at least one rotational speed variable characterizing a rotational speed of the internal combustion engine;
an ambient temperature characterizing a temperature of the ambient air; and
an ambient pressure characterizing a pressure of the ambient air.

18. The system as recited in claims 16 or 17, further comprising:

an arrangement for determining by a compressor model at least an air quantity flowing through a compressor, a supercharger power output, and a charge-air temperature;

wherein the determining operation by the compressor model is based on at least a supercharger rotational speed, an ambient pressure, a charge-air pressure, and an ambient temperature.

19. A system for controlling an internal combustion engine with an air system, comprising:

an arrangement for determining using at least one model, at least one variable characterizing the air system on the basis of at least one of at least one correcting variable and at least one measured variable characterizing a state of an ambient air, the at least one model including at least one first submodel and at least one second submodel;

an arrangement for determining, using at least one of the at least one first submodel and the at least one second submodel, a plurality of output variables based on a plurality of input variables;

an arrangement for determining by a compressor model at least an air quantity flowing through a compressor, a supercharger power output, and a charge-air temperature;

an arrangement for determining a density of air flowing through the compressor from the ambient temperature and the ambient pressure; an arrangement for determining an enthalpy difference from the ambient pressure and a charge-air pressure; and an arrangement for determining a volume of air from the supercharger rotational speed and the enthalpy difference;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity-to be injected;

wherein the determining operation by the compressor model is based on at least a supercharger rotational speed, an ambient pressure, a charge-air pressure, and an ambient temperature;

wherein the air quantity is determined based on the density and the volume.

20. The system as recited in claims 16, 17, or 19, further comprising:

an arrangement for determining using a high-pressure fresh-air line model at least a charge-air pressure, an oxygen proportion of an air quantity flowing into the internal combustion engine, and a mixture temperature;

wherein the determining operation using the high-pressure fresh-air line model is based on at least a plurality of air quantities flowing into a high-pressure fresh-air line, a plurality of oxygen proportions of the plurality of air quantities, a charge-air temperature, and a temperature in an exhaust gas recirculation line.

21. A system for controlling an internal combustion engine with an air system, comprising:

an arrangement for determining, using at least one model, at least one variable characterizing the air system on the basis of at least one of at least one correcting variable and at least one measured variable characterizing a state of an ambient air, the at least one model including at least one first submodel and at least one second submodel;

an arrangement for determining, using at least one of the at least one first submodel and the at least one second submodel, a plurality of output variables based on a plurality of input variables; and an arrangement for determining using a high-pressure fresh-air line model at least a charge-air pressure, an oxygen proportion of an air quantity flowing into the internal combustion engine, and a mixture temperature;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the determining operation using the high-pressure fresh-air line model is based on at least a plurality of air quantities flowing into a high-pressure fresh-air line, a plurality of oxygen proportions of the plurality of air quantities, a charge-air temperature, and a temperature in an exhaust gas recirculation line;

wherein at least one of the following is satisfied:
the oxygen proportion is determined based on the plurality of air quantities, the plurality of oxygen proportions of the plurality of air quantities, and at least one constant; and
the charge-air pressure is determined by integrating contributions of a plurality of pressure changes, the plurality of pressure changes being predefined based on at least one of an inflowing air quantity, an outflowing air quantity, an inflowing air temperature, and an outflowing air temperature.

22. A system for controlling an internal combustion engine with an air system, comprising:

an arrangement for determining, using at least one model, at least one variable characterizing the air system on the basis of at least one of at least one correcting variable and at least one measured variable characterizing a state of an ambient air, the at least one model including at least one first submodel and at least one second submodel;

an arrangement for determining, using at least one of the at least one first submodel and the at least one second submodel, a plurality of output variables based on a plurality of input variables; and computing by a cylinder model at least an exhaust gas temperature, a first air quantity flowing into the internal combustion engine, a second air quantity flowing out of the internal combustion engine, and a second oxygen proportion of the second air quantity;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the computing operation is based on at least the fuel quantity, a rotational speed, a charge-air pressure, a mixture temperature, and a first oxygen proportion of the first air quantity.

23. The system as recited in claim 22, wherein at least one of:

the exhaust gas temperature is determined based on the fuel quantity and the mixture temperature; and the first air quantity and the second air quantity air are determined based on at least one of the mixture temperature, the charge-air pressure, the rotational speed, and the fuel quantity.

24. A system for controlling an internal combustion engine with an air system, comprising:

an arrangement for determining, using at least one model, at least one variable characterizing the air system on the basis of at least one of at least one correcting variable and at least one measured variable characterizing a state of an ambient air, the at least one model including at least one first submodel and at least one second submodel;

an arrangement for determining, using at least one of the at least one first submodel and the at least one second submodel, a plurality of output variables based on a plurality of input variables; and an arrangement for determining using a turbine model at least an exhaust gas pressure, a supercharger rotational speed, and a temperature after a turbine;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the determining operation using the turbine model is based on at least a supercharger lift, an exhaust gas temperature, a pressure after the turbine, and an air quantity flowing through the turbine.

25. The system as recited in claim 24, wherein at least one of:

the exhaust gas pressure is determined based on the supercharger lift, the air quantity flowing through the turbine, the pressure after the turbine, and the exhaust gas temperature;

an enthalpy difference across the turbine is determined based on a pressure difference across the turbine, the pressure difference across the turbine being calculated from the exhaust gas pressure, the pressure after the turbine, and the exhaust gas temperature;

a temperature in an exhaust pipe is determined based on the enthalpy difference and the exhaust gas temperature; and the supercharger rotational speed is determined based on the enthalpy difference, a supercharger power output, and the air quantity flowing through the turbine.

26. The system as recited in claim 24, further comprising at least one of:

an arrangement for determining the exhaust gas pressure based on the supercharger lift, the air quantity flowing through the turbine, the pressure after the turbine, and the exhaust gas temperature;

an arrangement for determining an enthalpy difference across the turbine based on a pressure difference across the turbine and the exhaust gas temperature;

an arrangement for determining the temperature after the turbine based on the enthalpy difference and the exhaust gas temperature; and an arrangement for determining the supercharger rotational speed based on the enthalpy difference, a supercharger power output, and the air quantity flowing through the turbine.

27. A system for controlling an internal combustion engine with an air system, comprising:

an arrangement for determining, using at least one model, at least one variable characterizing the air system on the basis of at least one of at least one correcting variable and at least one measured variable characterizing a state of an ambient air, the at least one model including at least one first submodel and at least one second submodel;

an arrangement for determining, using at least one of the at least one first submodel and the at least one second submodel, a plurality of output variables based on a plurality of input variables; and an arrangement for determining using an exhaust pipe model a pressure after a turbine based on at least an air quantity flowing through the turbine, an ambient pressure, and a temperature after the turbine;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected.

28. A system for controlling an internal combustion engine with an air system, comprising:

an arrangement for determining, using at least one model, at least one variable characterizing the air system on the basis of at least one of at least one correcting variable and at least one measured variable characterizing a state of an ambient air, the at least one model including at least one first submodel and at least one second submodel;

an arrangement for determining, using at least one of the at least one first submodel and the at least one second submodel, a plurality of output variables based on a plurality of input variables; and an arrangement for determining using an exhaust gas recirculation model a temperature in an exhaust gas recirculation line and an air quantity flowing through the exhaust gas recirculation line;

wherein the at least one correcting variable, the at least one measured variable, and at least one output variable of the at least one second submodel are taken into account as input variables of the at least one first submodel;

wherein the at least one correcting variable includes a fuel quantity variable representing a fuel quantity to be injected;

wherein the determining operation using the exhaust gas recirculation model is based on an exhaust gas recirculation lift, a first temperature before an exhaust gas recirculation valve, a second temperature after the exhaust gas recirculation valve, a first pressure before the exhaust gas recirculation valve, and a second pressure after the exhaust gas recirculation valve.

29. The system as recited in claim 28, further comprising:

an arrangement for determining an air quantity flowing through the exhaust gas recirculation valve based on a pressure difference across the exhaust gas recirculation valve, a temperature of the air flowing through the exhaust gas recirculation valve, and the exhaust gas recirculation lift.

30. The system as recited in claim 29, wherein one of a charge-air temperature and an ust gas temperature is used, as a function of the pressure difference across the exhaust ecirculation valve, as the temperature of the air in the exhaust gas recirculation line.

* * * * *